S. E. PAGE.
PIPE JOINT.
APPLICATION FILED NOV. 7, 1919.

1,377,024.

Patented May 3, 1921.

INVENTOR
STEPHEN E. PAGE
BY
ATTORNEYS

UNITED STATES PATENT OFFICE.

STEPHEN EUGENE PAGE, OF BROOKLYN, NEW YORK, ASSIGNOR TO UNITED CONCRETE PIPE CO., OF NEW YORK, N. Y., A CORPORATION OF DELAWARE.

PIPE-JOINT.

1,377,024.

Specification of Letters Patent.

Patented May 3, 1921.

Application filed November 7, 1919. Serial No. 336,496.

*To all whom it may concern:*

Be it known that I, STEPHEN EUGENE PAGE, a citizen of the United States of America, residing at 101 Columbia Heights, in the city of New York, borough of Brooklyn, county of Kings, and State of New York, have invented certain new and useful Improvements in Pipe-Joints, of which the following is a specification.

My invention relates to pipe joints, and particularly to a joint for reinforced concrete pipe lengths, the object of my invention being to provide a pipe which is sealed wholly from the interior of the joint after the pipe-line is partially or completely laid.

In the accompanying drawings—

Figure 1:
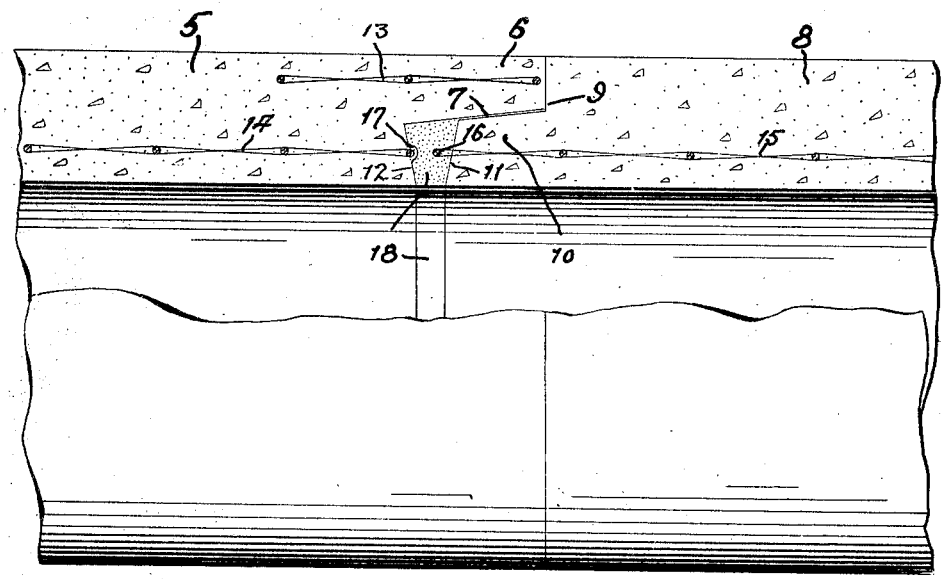
Figure 2:
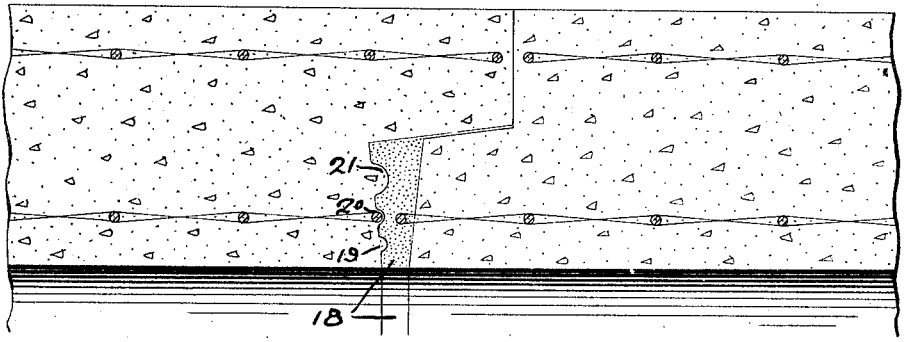

Figure 1 is a side elevation partially broken away showing a joint between the adjacent abutting lengths in which my invention is embodied in one form; and Fig. 2 is a similar view of a modified construction.

The present invention relates primarily to joints for reinforced concrete pipe which is not under pressure when in service, and the diameter of which is such that a workman may enter the pipe for sealing the joint after the pipe-line is partially or completely laid. Pipe of the present type is well adapted for use in sewer installations.

The general type of construction shown in Fig. 1 is suitable for a pipe of relatively small size. The joint is of the bell and spigot type, the end of the pipe 5 having a peripheral flange 6, the inner face 7 of which is conical, while the coöperating end of the pipe section 8 has a peripheral recess 9 and inner coned flange 10. The terminal face 11 of the latter is inclined and coöperates with the oppositely inclined face 12 of pipe 5 to form an undercut recess at the inner periphery of the joint. Preferably the abutting surfaces of the flange 6 and recess 9 are made as smooth and true as possible by casting the ends of the pipe sections on rings having these portions of its area machined, while the area of the undercut recess is left rough.

The metal reinforce of the pipe may be of any suitable character. I have shown a wire mesh ring 13 embedded in the outer area of the pipe end 5 and extending into the flange 6 to strengthen the latter. Toward the inner area of both pipe sections are further reinforcing cylindrical meshes 14 and 15, which are here shown arranged in alinement. The mesh 15 for pipe end 8 extends beyond the face 11 and enters the undercut recess at 16. The mesh 14 of pipe 5 terminates in and is embedded by an annular rib 17 formed on the face 12 and projecting into the undercut recess.

The pipe sections having been abutted to close the outer peripheral bell and spigot joint, a workman may then enter the pipe at once and fill the undercut recess with mortar 18, which is troweled into the recess. Of course, soft mortar will stay without difficulty in the portion of the joint below the spring line of the pipe. Above the spring line the mortar is retained while soft, on the one hand by the projecting reinforce 16, and on the other hand by the projecting bead 17, and on both sides by the relatively rough faces 11 and 12 of the pipe ends. Eventually the mortar after setting is retained as well by the undercut of the recess, from which it cannot escape.

In the modification shown in Fig. 2, the construction is in all essential particulars the same, but the pipe being of a larger size, and the undercut groove consequently deeper, I employ instead of a single annular rib 17, a group of radially spaced ribs 19, 20 and 21. Of these the innermost rib, 21, is the largest, thereby relieving to a greater extent the weight of the fairly heavy body of mortar troweled into the inner area of the recess. The undercut recess is as narrow as practicable, and does not ordinarily exceed seven-eighths of an inch in width at the inner periphery of the joint.

Inasmuch as the packing of the joint is accomplished wholly from the inside of the pipe, it enables the back-fill into the pipe trench to be proceeded with as soon as the pipe is laid and the pipe sections abutted together. The workman instead of plastering each joint as it is made, may enter the pipe-line at any subsequent time after the line has sufficiently "settled," and the packing of the joints between the unit sections may then be effected with greater assurance of remaining tight. By plastering from the inside, moreover, a full joint is assured since all parts of the joint are readily accessible from the interior, which is not the case with the lower portion of the joint on the exterior of the line after the pipe is laid.

Various modifications will readily occur to those skilled in the art, which do not depart from what I claim as my invention.

I claim—

1. A reinforced concrete pipe joint comprising abutting surfaces at the outer area of the joint, an undercut annular packing recess at the inner area of the joint, a metal mesh reinforce embedded in the concrete and projecting into said recess from one side to support a mortar fill while plastic, and to tie the latter to said side when the fill has hardened, together with concrete rib means cast integral with the opposite side of the recess to assist in supporting said mortar while plastic, but permitting the mortar fill to part freely from said side on contraction of the pipe lengths incident to low temperature conditions, while at the same time affording an extended creepage surface and thus minimizing leaks at the joint when the latter tends to open, together with mesh reinforce extending into and supporting said rib means.

2. A reinforced concrete pipe joint comprising abutting surfaces at the outer area of the joint, an undercut annular packing recess at the inner area of the joint, a metal mesh reinforce embedded in the concrete and projecting into said recess from one side to support a mortar fill while plastic, and to tie the latter to said side when the fill has hardened, together with concrete rib means cast integral with the opposite side of the recess to assist in supporting said mortar while plastic, but permitting the mortar fill to part freely from said side on contraction of the pipe lengths incident to low temperature conditions, while at the same time affording an extended creepage surface and thus minimizing leaks at the joint when the latter tends to open, said rib means comprising a plurality of ribs, certain of said ribs being of greater size than certain other of said ribs, and being located at greater depth in the recess.

In testimony whereof I have signed my name to this specification.

STEPHEN EUGENE PAGE.